Patented Feb. 7, 1939

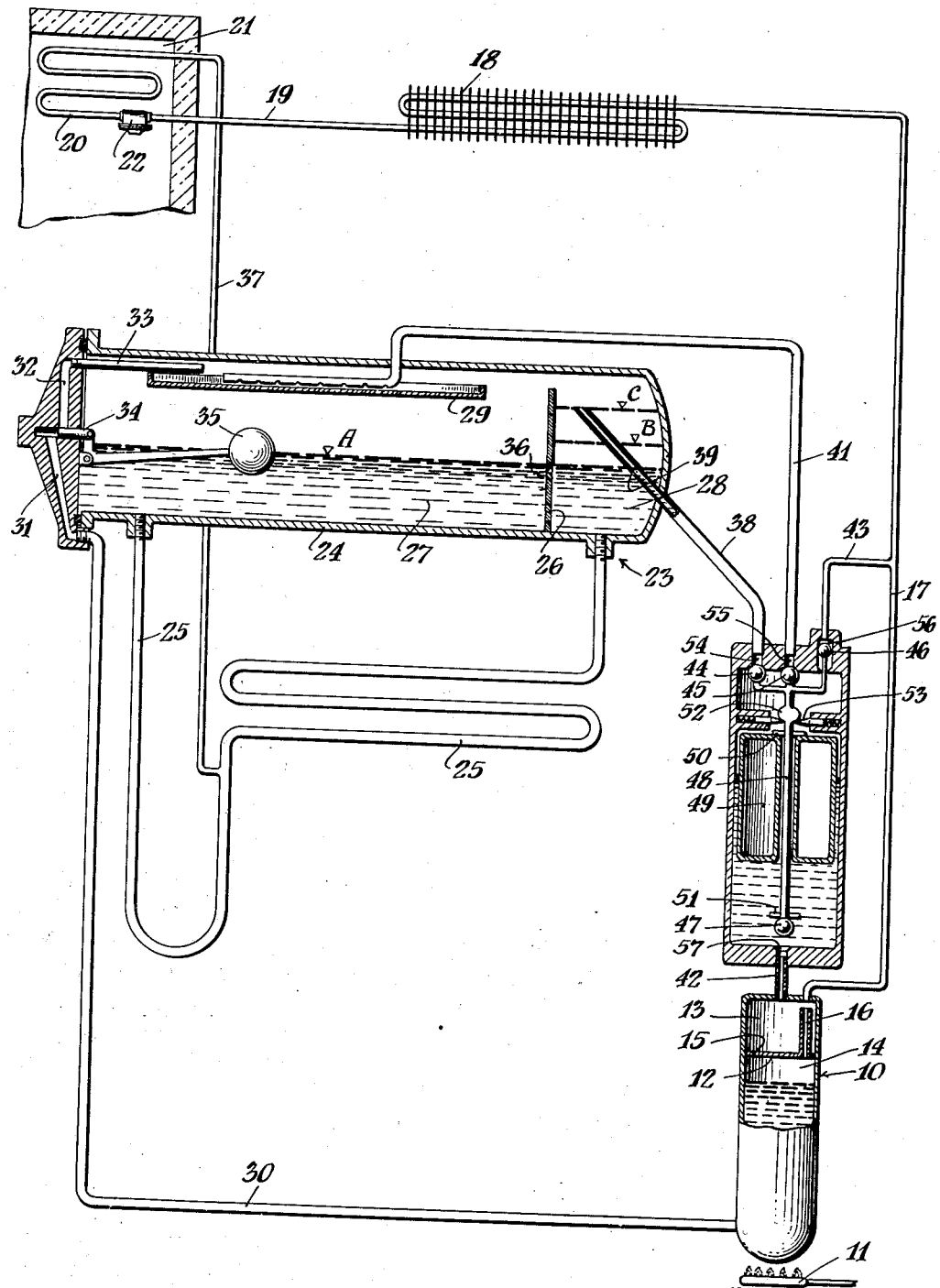

2,146,077

UNITED STATES PATENT OFFICE 2,146,077

REFRIGERATION

Walter A. Kuenzli, Evansville, Ind., assignor to Servel, Inc., New York, N. Y., a corporation of Delaware Application May 28, 1937, Serial No. 145,269

7 Claims. (Cl. 62—5)

My invention relates to a transfer vessel type of absorption refrigeration system and it is an object of the invention to provide an improved liquid level control system in which rate of liquid transfer varies automatically with refrigeration requirements, as set forth in the following description taken in connection with the accompanying drawing in which the single figure shows more or less diagrammatically a refrigeration system embodying the invention.

A generator 10 is heated by suitable means such as a gas burner 11. The upper part of the generator is divided by a partition 12 into an upper chamber 13 and a lower chamber 14. A small opening 15 provides for flow of liquid from chamber 13 downward into chamber 14. A vent conduit 16 connects the upper parts of chambers 13 and 14. The upper part of chamber 13 is connected by a conduit 17 to a condenser 18. The condenser is connected by a conduit 19 to an evaporator 20. The evaporator is shown located in a thermally insulated refrigerator storage compartment 21. Flow of liquid from conduit 19 to the evaporator 20 is controlled by an expansion valve 22 or other suitable control device.

An absorber 23 comprises a header 24 and a downward looped conduit 25. The header 24 is divided by a partition 26 into a float chamber 27 and an overflow chamber 28. Chambers 27 and 28 communicate over the top of partition 26. One end of conduit 25 is connected to the bottom of chamber 27 and the other end of conduit 25 is connected to the bottom of chamber 28. In the upper part of chamber 27 is an overflow pan 29.

The lower part of the generator 10 is connected by a conduit 30, a passage 31, a second passage 32 and conduit 33 to the interior of the absorber. Passages 31 and 32 are formed in a head plate on the absorber, and conduit 33 discharges into the overflow tray 29. Flow of liquid through conduits 31 and 32 is controlled by a valve 34 operated by a float 35 in the absorber float chamber 27. A small opening 36 in the partition 26 provides for restricted flow of liquid between chambers 27 and 28. A conduit 37 is connected from the evaporator 20 to the absorber coil 25. One end of a conduit 38 is connected to a transfer vessel 40 and the other end of conduit 38 projects upward into chamber 28 in the absorber header. The upper end of conduit 38 is above the normal liquid level in the absorber header and there is provided a small opening 39 for flow of liquid from chamber 28 into conduit 38. The transfer vessel 40 is also connected to the absorber by a conduit 41 of which one end is connected to the transfer vessel and the other end extends into the overflow tray 29.

The lower part of the transfer vessel 40 is connected by a conduit 42 to the upper chamber 13 of the generator 10. The upper part of transfer vessel 40 is connected by a conduit 43 to conduit 17.

In the transfer vessel 40 are valves 44, 45, 46 and 47, all of these valves being connected to a valve operating rod 48 so as to be operated in unison. On the valve rod 48 is mounted a float 49 which imparts movement to the valve rod 48 through pins 50 and 51. A cam 52 on rod 48 and spring pressed dogs 53 cause snap action of the valve rod 48 up and down as force is correspondingly applied thereto by the float 49 as hereinafter described. The transfer vessel valves are arranged as shown so that valves 44 and 45 are closed when valves 46 and 47 are open, and vice-versa. Valve 44 controls a passage 54 with which communicates conduit 38. Valve 45 controls a passage 55 with which communicates conduit 41. Valve 46 controls a passage 56 with which communicates conduit 43. Valve 47 controls a passage 57 with which communicates conduit 42.

In operation, a vaporous refrigerant fluid, such as ammonia, is expelled from solution in an absorbent, such as water, by heating in the generator 10. The refrigerant vapor flows from the generator chamber 14 through conduit 16, upper chamber 13, and conduit 17 to the condenser 18. The ammonia vapor is condensed to liquid in the condenser 18 and the liquid flows through the expansion valve 22, or other suitable pressure reducing device, into the evaporator 20. The liquid ammonia vaporizes in the evaporator 20, producing a refrigerating effect in the refrigerator compartment 21.

Ammonia vapor flows from the evaporator 20 through conduit 37 into the lower part of the absorber coil 25. The ammonia vapor flows upward in coil 25 and is absorbed into solution with absorption liquid which floods the coil 25. Upward flow of vapor through coil 25 causes flow of absorption liquid from the absorber chamber 27 through the absorber coil 25 into the absorber chamber 28. Liquid flows from chamber 28 through opening 36 into chamber 27.

Weakened absorption liquid flows from the lower part of the generator 10 through conduit 30, passages 31 and 32, and conduit 33 into the shallow tray 29 whence it overflows into the absorber chamber 27. Flow of absorption liquid from passage 31 to passage 32 is controlled by the valve 34, operated by the float 35. Operation of the valve 34 controls flow of liquid into chamber 27 so that the liquid level in this chamber is maintained substantially constant at a level marked A. When there is no flow of liquid through the absorber coil 25 or when the flow of liquid through this coil is less than a predetermined rate, the level of liquid in chamber 28 is at A the same as in chamber 27. However, when liquid flows into chamber 28 through the absorber coil 25 at a rate greater than flow of liquid through the opening 36, the level of liquid in chamber 28 rises above that in chamber 27, as to a level marked B. The greater the rate of flow of liquid into chamber 28, the higher the level of liquid in this chamber above the level in chamber 27. The rate of flow of liquid through the absorber coil 25 is responsive to the amount of vapor introduced into this coil from the evaporator through conduit 37. The amount of vapor flowing through conduit 37 depends upon the refrigeration demand upon the evaporator 20. Thus, the greater the demand for refrigeration, the higher the level of liquid in the absorber chamber 28.

Liquid flows from the absorber chamber 28 through orifice 39 into conduit 38. Upon increase in level of liquid in chamber 28, the rate of liquid flow through orifice 39 increases due to the greater head of liquid above this orifice. The maximum rate of flow of liquid from chamber 28 into conduit 38 is reached when the level of liquid in chamber 28 reaches the level C at which point the liquid overflows into the open upper end of conduit 38.

Assuming that the transfer vessel 40 is empty so that the float 49 is in its lower position, valves 47 and 46 are closed and valves 44 and 45 are open. Liquid flows through conduit 38 from the absorber into passage 54 and past the open valve 44 into the transfer vessel. As the transfer vessel fills with liquid, vapor escapes past the open valve 45 through passage 55 and conduit 41 into the absorber where it bubbles into liquid in the overflow tray 29 and is absorbed in the liquid. Liquid rises in the transfer vessel 40 until the float 49 overcomes the resistance of the toggle mechanism to snap valves 44 and 45 closed and valves 46 and 47 open. This is the position of the valves shown in the drawing. Liquid in the transfer vessel now discharges through passage 57 and conduit 42 into the chamber 13 of the generator 10. The pressures in the generator and transfer vessel are equalized by flow of vapor from conduit 17 through conduit 43, passage 56, and past the open valve 46 into the transfer vessel. As liquid flows out of the transfer vessel into the generator, the net weight of the float 49 increases until it overcomes the resistance of the toggle mechanism to snap valves 47 and 46 closed and valves 44 and 45 open. This cycle is repeated at intervals dependent upon the rate of flow of liquid from the absorber to the transfer vessel through conduit 38. Thus, as the flow of liquid through conduit 38 increases responsive to increase in demand for refrigeration, as previously explained, the operation of the transfer vessel becomes more rapid. The rapidity of operation of the transfer vessel increases until the maximum rate of flow through conduit 38 is reached when liquid overflows into the open upper end of this conduit as previously explained.

The enriched absorption liquid transferred into chamber 13 of the generator 10 flows through opening 15 in the partition 12 into the lower chamber 14 so that the flow of liquid through the heated chamber 14 is a steady flow. The rate of flow of liquid through the opening 15 from the chamber 13 into chamber 14 of the generator also increases as the level of liquid in chamber 13 so that liquid circulation through and between the generator and absorber takes place automatically at a rate responsive to refrigeration requirements.

Various changes may be made within the scope of the invention which is not limited as shown in the drawing or set forth in the foregoing part of this specification but only as indicated in the following claims.

What is claimed is:

1. An absorption refrigeration system including an absorber, a generator, liquid level responsive means for controlling flow of liquid from said generator to said absorber, a device for transferring liquid between said absorber and generator at a rate responsive to flow of liquid to said device, and means for varying flow of liquid from said absorber to said device responsive to demand for refrigeration.

2. An absorption refrigeration system including an evaporator, an absorber, a generator, a device for transferring liquid between said absorber and generator at a rate responsive to flow of liquid to said device, and means for varying flow of liquid to said device responsive to flow of vapor from said evaporator to said absorber.

3. An absorption refrigeration system including an evaporator, an absorber, a generator, a device for transferring liquid between said absorber and generator, a conduit for vapor from said evaporator to said absorber, said absorber being constructed and arranged so that flow of vapor thereto from said evaporator causes local circulation of liquid in the absorber, and means for flowing liquid from said absorber to said transfer device at a rate responsive to said local circulation.

4. A method of refrigeration which includes conducting vapor from a place of evaporation to a place of absorption, conducting absorption liquid from a place of vapor expulsion to said place of absorption, conducting enriched absorption liquid from said place of absorption to a place of transfer, conducting liquid from said place of transfer to said place of expulsion at intervals dependent upon rate of liquid conduction to said place of transfer, and conducting liquid to said place of transfer at a rate responsive to conduction of vapor to said place of absorption.

5. In a transfer vessel type absorption refrigeration system, an absorber having two chambers, a transfer vessel operative responsive to flow of liquid thereto, means for controlling flow of liquid into said absorber responsive to level of liquid in one of said chambers, and means for delivering liquid to said transfer vessel responsive to level of liquid in the other of said chambers.

6. In a transfer vessel type absorption refrigeration system, an absorber having two chambers, a conduit for flow of liquid between said chambers, an evaporator, a conduit for vapor from said evaporator connected to said absorber conduit so that vapor introduced in the latter causes flow of liquid therethrough from one chamber to the other, means for admitting absorption liquid to said first chamber responsive to level of liquid therein, a transfer vessel, and means for conducting liquid to said transfer vessel from said other absorber chamber responsive to level of liquid therein.

7. A method of refrigeration which includes transferring absorption liquid from a place of expulsion to a place of absorption responsive to liquid level at said place of absorption, transferring absorption liquid from said place of absorption to said place of expulsion through an intermediate place of transfer at a rate dependent upon rate of arrival of liquid at said place of transfer, and controlling said rate of arrival responsive to demand for refrigeration.

WALTER A. KUENZLI.